United States Patent [19]

Schucker et al.

[11] Patent Number: 5,169,530
[45] Date of Patent: Dec. 8, 1992

[54] HOLLOW FIBER MODULE USING FLUID FLOW CONTROL BAFFLES

[75] Inventors: Robert C. Schucker; Charles P. Darnell, both of Baton Rouge, La.; Mahmoud M. Hafez, Brides Grove, Canada

[73] Assignee: Exxon Research and Engineering Company, Florham Park, N.J.

[21] Appl. No.: 855,360

[22] Filed: Mar. 19, 1992

Related U.S. Application Data

[63] Continuation of Ser. No. 423,178, Oct. 18, 1989, abandoned.

[51] Int. Cl.$^5$ .............................................. B01D 63/02
[52] U.S. Cl. .............................. 210/321.81; 210/321.9; 210/500.23
[58] Field of Search ............ 210/321.72, 321.78, 210/321.87, 500.23

[56] References Cited

U.S. PATENT DOCUMENTS

| | | | |
|---|---|---|---|
| 3,557,962 | 1/1971 | Kohl | 210/321 |
| 3,690,465 | 9/1972 | McGinnis et al. | 210/321 |
| 3,728,256 | 4/1973 | Cooper | 210/22 |
| 3,957,648 | 5/1976 | Roget et al. | 210/321 |
| 4,080,296 | 3/1978 | Clark | 210/321.87 |
| 4,105,731 | 8/1978 | Yamazaki | 264/94 |
| 4,146,597 | 3/1979 | Eckstein et al. | 261/104 |
| 4,190,411 | 2/1980 | Fujimoto | 425/434 |
| 4,220,535 | 9/1980 | Leonard | 210/321 |
| 4,231,879 | 11/1980 | Spanger | 210/321 |
| 4,239,729 | 12/1980 | Hasegawa et al. | 422/48 |
| 4,268,279 | 3/1981 | Shindo et al. | 210/321.8 |
| 4,276,249 | 6/1981 | Holladay | 264/139 |
| 4,367,139 | 1/1983 | Graham | 210/321.3 |
| 4,389,363 | 6/1983 | Molthop | 264/135 |
| 4,769,146 | 9/1988 | Schmidt | 210/321.8 |

FOREIGN PATENT DOCUMENTS

| | | |
|---|---|---|
| 0009543 | 4/1980 | European Pat. Off. |
| 0203489 | 11/1986 | European Pat. Off. |
| 8401522 | 4/1984 | Int'l Pat. Institute |
| 4128984 | 10/1979 | Japan |
| 1-281126 | 11/1989 | Japan |
| 1498531 | 8/1989 | U.S.S.R. |
| 1500945 | 2/1978 | United Kingdom |
| 2009034 | 6/1979 | United Kingdom |
| 2011274 | 7/1979 | United Kingdom |

Primary Examiner—Frank Sever
Attorney, Agent, or Firm—Joseph J. Allocca

[57] ABSTRACT

Hollow fiber membrane separation elements are improved with respect to fluid flow and contacting by dividing the bundle of hollow membrane fibers in the element into discrete sub-bundles by use of baffles in the module.

3 Claims, 3 Drawing Sheets

HOLLOW FIBER MODULE USING FLUID FLOW CONTROL BAFFLES

CROSS REFERENCE TO RELATED APPLICATIONS

This is a continuation of application Ser. No. 423,178, filed Oct. 18, 1989, abandoned.

BACKGROUND OF THE INVENTION

In fabricating membrane modules maximizing the contacting efficiency is of tremendous importance. Contacting efficiency is a function of fluid dynamics and this is particularly true in concentration gradient driven processes (perstraction and pervaporation applications) and in pressure driven processes (reverse osmosis and ultrafiltration).

Current permeator designs suffer from contacting efficiency limitations. Spiral wound, tubular membrane, flat sheet, and hollow fiber modules all exhibit contacting efficiency limitations and attempt to address the limitations in various ways, including the use of flow direction blocks, turbulence promoters on the surface of the membrane, specially designed feed/retentate spacers, anti-channeling wraps etc. Absent such expedients the contacting efficiency limitations are compensated for by employing more or larger modules so as to provide more effective surface area.

Contacting efficiency limitations cannot be tolerated where separation efficiency targets are high or where large volumes of materials are to be handled. Providing additional surface area to compensate for inefficient contacting is not an acceptable solution in those cases.

The present invention presents a permeator design criterion which significantly reduces contacting efficiency limitation problems, especially for hollow fiber modules, without adding more surface area.

DESCRIPTION OF THE INVENTION

Figure 1:
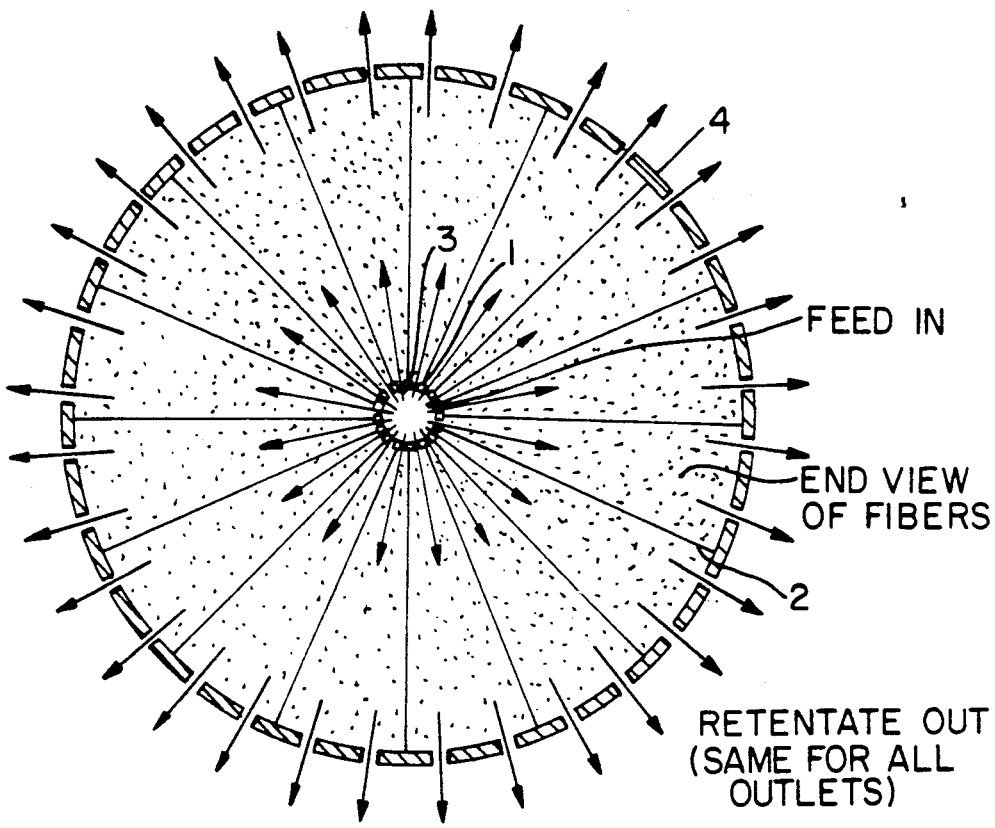
FIGS. 1 and 1a are schematics of a multi-sector baffled permeator device.

An improved bundled hollow fiber membrane separation element is described in which the bundle of hollow fibers surrounding a central mandrel enclosed by a container is divided into a number of sub-bundles by means of multiple baffles attached to the central mandrel extending down its length and projecting radially from the central mandrel axis, defining quadrants from the central mandrel to the interior wall of the container. The multiple baffles attached to the central mandrel are separated at the point of attachment from each other by one of a set of holes arranged in rows or a slit running the length of the central mandrel which defines the apex of the quadrant. The container wall at the outer periphery of each quadrant is likewise equipped with a number of holes or a slit through which fluid can escape from the module. As used hereinafter in the specification and claims "holes" is understood to embrace both a series of holes or a slit running the length of the mandrel, or in the baffle plate or vessel wall, wherever the term "holes" is employed as the case may be. The baffles are attached to the central mandrel but are not necessarily attached to the interior wall of the container. The mandrel/baffle/hollow fiber assembly can be treated as a separate sub assembly, wrapped with a permeable wrap and inserted into a container vessel, the walls of which are pierced by holes to allow fluid flow. If the baffles are attached to the interior wall of the container the vessel hardware can be fabricated as a single unit comprising central mandrel-baffles-container which is then loaded with hollow fibers placed in each discrete quadrant.

In either case the ends of the module through which the ends of the hollow fibers run is potted or closed using a material to define a closed element defining a feed/retentate zone and a separate permeate zone.

The baffles need not be solid sheets of material but any material which to some extent restricts the free passage of fluid can be used. The baffle serves the purpose of preventing the channelling of fluid on the hollow fiber module. In hollow fiber modules without baffles the fluid to be separated or alternatively the sweep fluid, when introduced into the module will usually flow along the path of least resistance. This is not necessarily the most desirable situation insofar as such channelling reduces the contacting which must occur between the fluid to be separated (or the sweep fluid used to maintain the concentration gradient) and the hollow fibers if efficient separations are to be obtained. The baffles prevent the channelling by forcing the fluid in each sector to flow through only that sector and not through some low resistance area elsewhere in the module.

In a variation of this basic design, alternate baffles can themselves have holes or slits at alternating ends, i.e. one baffle has holes running its length down the end closest to the mandrel while its two neighboring baffles (on either side) have holes running the length of the ends closest to the container wall. The container wall itself is pierced by only a limited series of holes and not the numerous series of the previous embodiment. Hereafter this configuration is described as "the alternate pierced baffle plate design".

In such a configuration the hollow fiber module contains hollow fibers surrounding a central mandrel which are enclosed by a container, the container being divided into one or more separate sectors, each sector being divided into a number of quadrants by means of baffle plates affixed to the central mandrel along its length and to the interior wall of the container, the central mandrel in each sector having a single row of holes running its length between a single pair of baffle plates, one of the baffle plates bordering said row of holes being unpierced and extending from the central mandrel to the interior wall of the container, the other baffle plate having a row of holes along the edge opposite the central mandrel and nearest the edge of attachment to the interior wall of the container, each baffle plate thereafter being alternately pierced by holes either near the edge of attachment to the central mandrel or near the edge of attachment to the interior wall of the container so as to define a serpentine fluid flow pattern, the container wall in each sector being equipped with a single set of holes defining fluid exit/entrance means in the quadrant adjacent to the next quadrant having holes in the central mandrel and bounded by an unpierced baffle plate, the module ends through which the hollow fibers pass being potted to define a feed retentate zone and a permeate zone.

In this embodiment (one series of central mandrel holes and alternate pierced baffle plate design) the containment vessel has only one series of exit/entrance holes in its body. This series of holes runs the length of the container, parallel to the central mandrel and is most effectively placed so as to be in the container wall of the quadrant immediately adjacent to and downstream from the quadrant having holes in the central mandrel, the baffle common to these two pie shaped quadrants being free of any holes. In this configuration the fluid to be separated can be fed into the central mandrel and enters the first pie shaped quadrant through the series of holes in the mandrel. The fluid flows past the sub-bundle on the outside of the hollow fibers and the component to be separated permeates into the interior of the hollow fiber under the influence of a driving force which can be an applied pressure on the outside of the hollow fiber or a concentration gradient on the inside of the fiber maintained by use either of a sweep fluid (perstraction) or a vacuum (pervaporation). The feed moves across the hollow fibers to the outer edge of the pie shaped quadrant wherein one of the baffle walls is pierced by a series of holes permitting the fluid to flow into a second pie shaped sector. Because the next series of holes in the next baffle plate is back near the apex end of the pie shaped quadrant the fluid is forced to turn a corner and flow through the holes in the baffle plate near the outer edge of the pie shaped quadrant to the holes in the adjoining baffle plate which are near the central mandrel. This serpentine flow pattern is maintained through a multiplicity of pie shaped quadrant until the fluid reaches the final quadrant adjacent to the unpierced baffle plate. This pie shaped quadrant is pierced by holes in the container wall wherein the retentate fluid exits the vessel. The material which permeates through the hollow fibers is recovered outside the potted ends of module. Of course, flow can be reversed, that is, the feed can be introduced into the module through the opening in the outer vessel wall while retentate is removed through the central mandrel. Permeate is recovered from the interior of the hollow fibers.

While the operation of only a single series of holes embodiment has been described, it is possible that the module is divided to a number of sectors e.g. 180° sectors or 120° sectors, etc. center mandrel being pierced by 2, 3 or more series of holes, one series corresponding to the upstream quadrant of each sector with serpentine channel flow directing baffles in each quadrant, the walls of and module in each sector being themselves pierced in the last quadrant downstream from the quadrant having holes in the center mandrel but upstream from the next quadrant having holes in the center mandrel. Such sectors are defined by the unpierced baffle plate extending the radius of the mandrel from the center mandrel to the wall of the vessel.

Likewise all fluid flows can be reversed with feed being introduced into the center of the hollow fibers with sweep fluid being introduced into the module through either the center mandrel or through the opening in the outer vessel wall. When sweep is introduced through the center mandrel, the permeate/sweep stream is recovered through the opening in the outer vessel wall.

The module can also be divided into a number of separate sectors, each sector being divided into a multiplicity of quadrants using baffle plates in yet another way. A central mandrel surrounded by a bundle of hollow fibers fitted inside a perforated vessel is located inside a containment vessel. The central mandrel has a single row of holes in each sector down its length in the limit, a single row of holes when to module has a single sector. Each sector is defined by an unpierced baffle plate extending from the central mandrel through the perforated vessel to an edge of attachment to the interior wall of the containment vessel. A first unpierced baffle plate is attached to said central mandrel and extends through the wall of the perforated vessel through a periphery zone between the perforated vessel and the containment vessel to an edge of attachment along the interior wall of the containment/accumulation vessel; a second baffle plate similarly unpierced is on the other side of the row of holes in the central mandrel and is just affixed to the interior wall of the perforated vessel. Alternate baffle plates are (1) affixed to the central mandrel and pierced by a row of holes along the edge adjacent to the central mandrel (or spaced away from the central mandrel) and (2) affixed to the central mandrel and unpierced by holes. All the baffle plates are attached to the interior wall of the perforated vessel; those baffle plates which are affixed to the central mandrel and pierced by holes (or spaced away from the central mandrel) extending through the perforated vessel wall into the periphery zone defined by the perforated vessel and an unperforated containment/accumulation vessel and attached to the interior wall of said containment/accumulation vessel thereby dividing the periphery zone into quadrants to thereby define a serpentine fluid flow pattern, the wall of the containment/accumulation vessel in the area of the last quadrant of the periphery zone for each sector being fitted with a fluid exit/entrance means. The module ends through which the hollow fibers pass are potted to define a feed-retentate zone and a permeate zone.

Feed entering the module through the row of holes in the central mandrel is forced by the unpierced baffle plates to flow to the periphery of the entrance quadrant and there passes through the holes in the wall of the perforated vessel into the periphery zone. The fluid flows in the periphery zone until it meets the obstacle formed by an extending baffle wall which directs fluid flow back through the holes in the perforated vessel wall into a second quadrant with flow directed back to the central mandrel. The baffle plate which created the periphery zone block is not attached to the central mandrel or if attached is perforated by a row of holes near the central mandrel so fluid flow is directed around the baffle and into a third quadrant, with the flow heading back to the periphery zone. The fluid again passes through the holes in the perforated vessel into a quadrant of the periphery zone wherein flow is again forced by an extended baffle plate to turn back into the perforated vessel through the holes in its walls to again flow toward the central mandrel.

This convoluted serpentine flow continues until the feed fluid reaches a last or end quadrant at which flow is prevented from passing on to the next quadrant by a flow block baffle and is recovered via exit means fitted in the containment/accumulation vessel. Permeate is recovered from the interior of the hollow fibers. In such a design the module can also be divided into 2, 3 or more sectors each with a number of quadrant employing baffles to define sequntive flow pattern, each section being serviced by a quadrant having a row of holes in the center mandrel and a downstream end quadrant fitted with exit/entrance means. Of course, flow can be reversed with feed being introduced into the hollow fibers and sweep fluid being introduced through either the center mandrel or the hole in the containment/accumulator vessel wall at the end quadrant.

These hollow fiber membrane separator elements containing baffle plates can be constructed out of any appropriate material which can stand up to the environment to which it is exposed. If the driving force is an applied pressure a vessel constructed of pressure resistant material, or at least reinforced to withstand the pressure is needed. Such a vessel can be metal (steel, brass, aluminum etc.) or polymer such as nylon or glass reinforced polymer and can be cast as a single unit (with open ends into which the hollow fibers can be inserted into the module). When the hardware is produced as a single piece the necessary holes can be machined into the mandrel, baffles and container walls by appropriate machining and hole drilling techniques. Alternatively the module can be manufactured in parts which are machined so as to have the holes in proper location and the parts subsequently assembled using adhesives or welding as appropriate. Modules employed in perstraction or pervaporation processes can be similarly extruded as a single piece (with open ends) or assembled from parts made of materials which can withstand the feed and sweep fluids used (in the case of perstractor) and the temperatures and vacuum used (for pervaporation).

Because of the open ends of the module which are needed for insertion of the hollow fibers, the production of a closed vessel defining a feed-retentate zone and a permeate recovery zone requires that the open ends be somehow closed with the ends of the hollow fibers projecting beyond the closure and remaining unplugged. This can be easily accomplished by potting the module ends using an appropriate adhesive such as epoxy or silicon resins. Other thermoset or catalytically set resins or plastics can be used, depending on the service in which the module will be used.

Membrane modules of this configuration can be used in any number of separations, to treat brackish water, deoiling, waste water recovery, separation of organic mixtures, aromatics from non-aromatics separations, extraction solvent recovery etc. The list of potential application is only limited by the imagination of the practitioner.

The hollow fibers can themselves be any of the typical polymeric separation membranes now known or hereafter discovered for use in separation processes. Further, the hollow fiber can even be hollow ceramic tubes such as porous alumina, cordierite etc. Typical membrane hollow fiber can be regenerated cellulose, polyvinyl alcohol, cellulose esters, cellulose ethers, mixed cellulose ester/ethers, polyurethane, polyurea/urethane, polybenzimidazoles, polyimide, polysulfone, nylon, teflon, polypropylene etc.

The invention of the present application will be better understood by reference to the following figures.

Figure 1A:
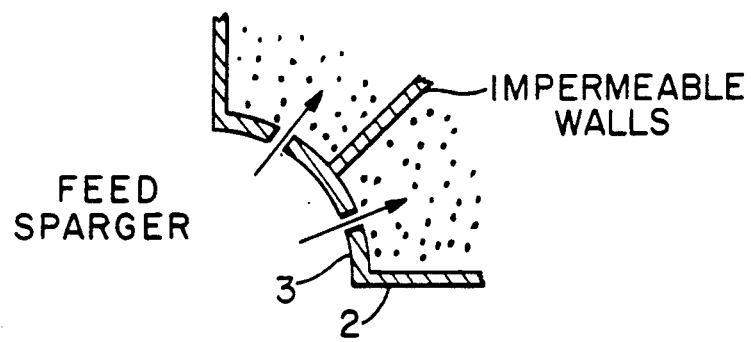

FIGS. 1 and 1(a) are schematics of a multi-sector device wherein the central mandrel (1) has a multiple of solid baffle plates (2) extending radially therefrom, which central mandrel has a multiple series of holes (3) running down its length between the points of attachment of the baffles to the mandrel. In the embodiment of the figure the baffles are connected at both ends, one end to the central mandrel, the other to the interior wall of the vessel (4). The walls of the container vessel are also pierced by holes in each pie shaped sector. This module can be placed in a final containment vessel not shown so that the fluid exiting the holes in the walls of the container vessel can be directed in a controlled manner to a storage vessel or to other processing vessels for further processing.

Figure 2:
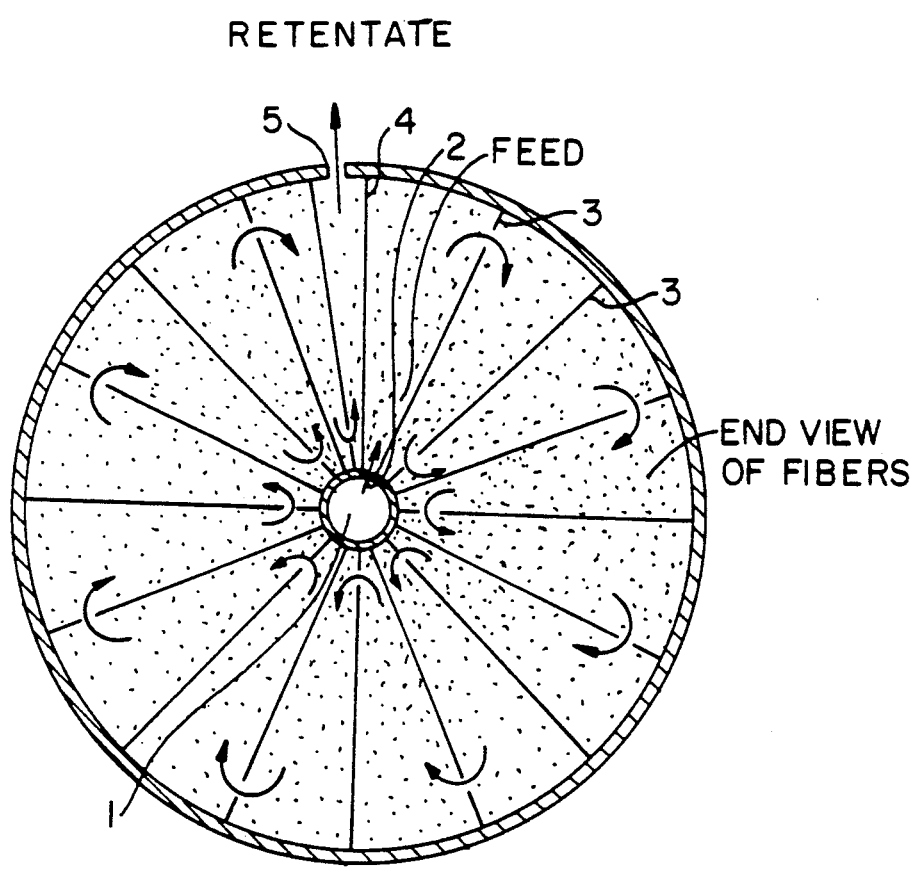
FIG. 2 is a schematic of a multi-sector baffled permeator device having an alternately pierced baffle plate design.

FIG. 2 is a schematic of a multi sector device having the alternately pierced baffle plate design. A central mandrel (1) having only a single row of holes (2) has radiating from it a multiple of baffle plates (3). These baffle plates are alternately pierced either near the end closest to the central mandrel or closest to the point of attachment to the interior wall of the container vessel. A final unpierced baffle plate (4) forms the common wall between the feed introduction sector and the retentate exit sector. The retentate exit sector has a hole or series of holes (5) in the wall of the container vessel to permit exit of the feed/retentate.

Figure 3:
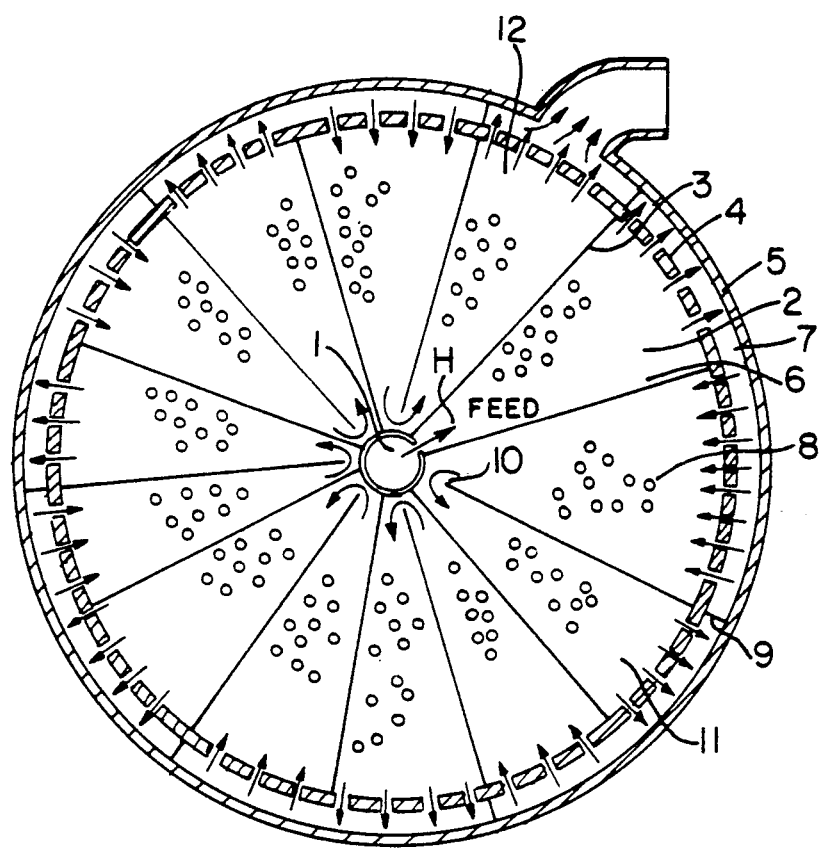
FIG. 3 is a schematic of a multi-sector baffled hollow fiber device having a periphery zone for fluid flow between sectors.

FIG. 3 is a schematic of a multi sector hollow fiber device having a periphery zone for fluid flow between sectors. The device has a central mandrel (1) pieced by only a single row of holes (H) by which feed is introduced into a first sector (2). This first sector is formed by an unpierced baffle plate (3) extending from the central mandrel (1) through a perforated vessel wall (4) and attached to the interior wall of a containment/accumulation vessel (5) and an unpierced baffle plate 3(A) attached to the central mandrel but extending only to the interior wall of the perforated vessel. Hollow fibers (6) are in this first sector and in all subsequent sectors. Feed entering this first sector from the central mandrel flow past the hollow fibers and through the perforated vessel into the periphery zone (7) which exists between the perforated vessel (4) and the containment vessel (5). Feed flow is forced to enter a second sector (8) through holes in the perforated vessel wall by being diverted by a block created by a baffle plate (9) which is attached to the interior wall of the containment vessel and extends into the module to near the central mandrel. This baffle plate, if attached to the central mandrel is pierced by holes or opening along the edge close to the mandrel. Alternatively the baffle plate is spaced away from the central mandrel. In either event the holes or the gap created by spacing the baffle plate away from the central mandrel (designated 10) creates a feed flow path which directs the feed into yet another downstream sector (11) for contacting with additional hollow fibers. The feed continues into serpentine flow through the module until it enters a final sector (12). In that sector further flow to other sectors is prevented by the unperforated baffle plate (3) attached to the central mandrel and the interior wall of the containment vessel. Feed flow is directed out of the module through feed/retentate exit means 13.

In any of the above described configurations the ends of the vessel are potted to define separate feed/retentate and permeate zones. The hollow fibers extend through this potting and are not plugged and thus are open to the separate permeate zone permitting free passage of the permeate from the interior of the hollow fibers, through the potting and into a permeate recovery zone.

What is claimed is:

1. A hollow fiber module wherein hollow fibers surround a central mandrel and are enclosed by a container, the container being divided into a number of quadrants by means of means for directing fluid on the fiber exterior substantially entirely in radial, cross-flow to the fibers including baffles affixed to the central mandrel along its length and the interior wall of the container the central mandrel having rows of holes running its length between the aforesaid baffle plates, the container wall being equipped with holes in each quadrant defined by the baffle plates, the module ends through which the hollow fibers pass being potted to define a feed retentate zone and permeate zone.

2. A hollow fiber module wherein hollow fibers surround a central mandrel and are enclosed by a container, the container being divided into one or more separate sectors, each sector being divided into a number of quadrants by means for directing fluid on the fiber exterior substantially entirely in radial, cross-flow to the fibers including means of baffle plates affixed to the central mandrel along its length and to the interior wall of the container, the central mandrel in each sector having a single row of holes running its length between a single pair of baffle plates, one of the baffle plates bordering said row of holes being unpierced and extending from the central mandrel to the interior wall of the container, the other baffle plate having a row of holes along the edge opposite the central mandrel and nearest the edge of attachment to the interior wall of the container, each baffle plate thereafter being alternately pierced by holes either near the edge of attachment to the central mandrel or near the edge of attachment to the interior wall of the container so as to define a serpentine fluid flow pattern, the container wall in each sector being equipped with a single set of holes defining fluid exit means in the quadrant adjacent to the next feed inlet quadrant and bounded by an unpierced baffle plate, the module ends through which the hollow fibers pass being potted to define a feed retentate zone and a permeate zone.

3. A hollow fiber module wherein hollow fibers surround a central mandrel which are fitted inside a perforated vessel and are enclosed by a container, the container being divided into one or more separate sectors, each sector being divided into a number of quadrants by means of means for directing fluid on the fiber exterior substantially entirely in radial cross-flow to the fibers including a first baffle plate unpierced by holes attached to said central mandrel the central mandrel having a single row of holes running its length each sector, the unpierced baffle plate in each sector being attached to the central mandrel along one side of the row of holes, said unpierced baffle plate extending through the wall of a perforated vessel into a periphery zone defined by the perforated vessel and a containment/accumulation vessel to an edge of attachment along the interior wall of the containment/accumulation vessel, a second unpierced baffle plate affixed to the central mandrel along the other side of the row of holes in the central mandrel and attached to the interior wall of the perforated vessel and additional baffle plates alternately affixed (1) to the central mandrel and pierced by a row of holes along the edge adjacent to the central mandrel (or spaced away from the central mandrel) and (2) affixed to the central mandrel and unpierced by holes, all of which said baffle plates are attached to the interior wall of a perforated vessel, those baffle plate which are affixed to the central mandrel and pierced by holes (or spaced away from the central mandrel) extending through the wall of the perforated vessel into the periphery zone defined by the perforated vessel and the unperforated containment/accumulation vessel and attached to the interior wall of the containment/accumulation vessel so that the periphery zone is itself divided into quadrants so as to define a serpentine fluid flow pattern, the wall of the containment/accumulation vessel in the area of the last quadrant of said periphery zone of each sector being fitted with a fluid exit/entrance means, the module ends through which the hollow fibers pass being potted to define a feed-retentate zone and a permeate zone.

* * * * *